United States Patent [19]

Flasza

[11] 4,253,118
[45] Feb. 24, 1981

[54] SYNCHRONOUS DETECTION SYSTEM

[75] Inventor: Michael D. Flasza, Schaumburg, Ill.

[73] Assignee: Zenith Radio Corporation, Glenview, Ill.

[21] Appl. No.: 54,325

[22] Filed: Jul. 2, 1979

[51] Int. Cl.³ .............................................. H04N 5/44
[52] U.S. Cl. .................................. 358/188; 455/260; 455/265; 329/50
[58] Field of Search ................ 358/188; 455/208, 255, 455/257, 260, 265; 329/50, 122–125

[56] References Cited

U.S. PATENT DOCUMENTS

| 3,750,029 | 7/1973 | Baars | 358/188 |
| 3,862,361 | 1/1975 | George | 358/188 |
| 3,883,806 | 5/1975 | DeLong | 329/124 |
| 3,939,425 | 2/1976 | Toyoshima | 329/124 |
| 4,091,410 | 5/1978 | Citta | 455/208 |
| 4,146,843 | 3/1979 | Isobe | 329/122 |
| 4,157,569 | 6/1979 | Apeldoorn | 358/188 |

Primary Examiner—Robert L. Griffin
Assistant Examiner—Michael A. Masinick
Attorney, Agent, or Firm—Zenith Radio Corporation

[57] ABSTRACT

A system is described for synchronously detecting a video signal along a selectable detection axis. The system includes a limiter receiving an input video signal and a phase-locked loop for developing an oscillator signal whose frequency is locked to the frequency of the video signal. A phase-adjustment network recieves the oscillator signal from the phase-locked loop for adjusting the phase of the oscillator signal such that it corresponds to the desired axis of detection. A synchronous detector receives the input video signal and the phase-adjusted oscillator signal for detecting the video signal along the selected detection axis.

8 Claims, 7 Drawing Figures

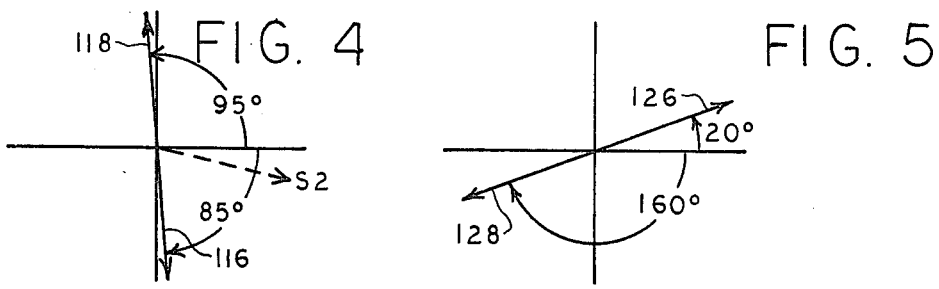
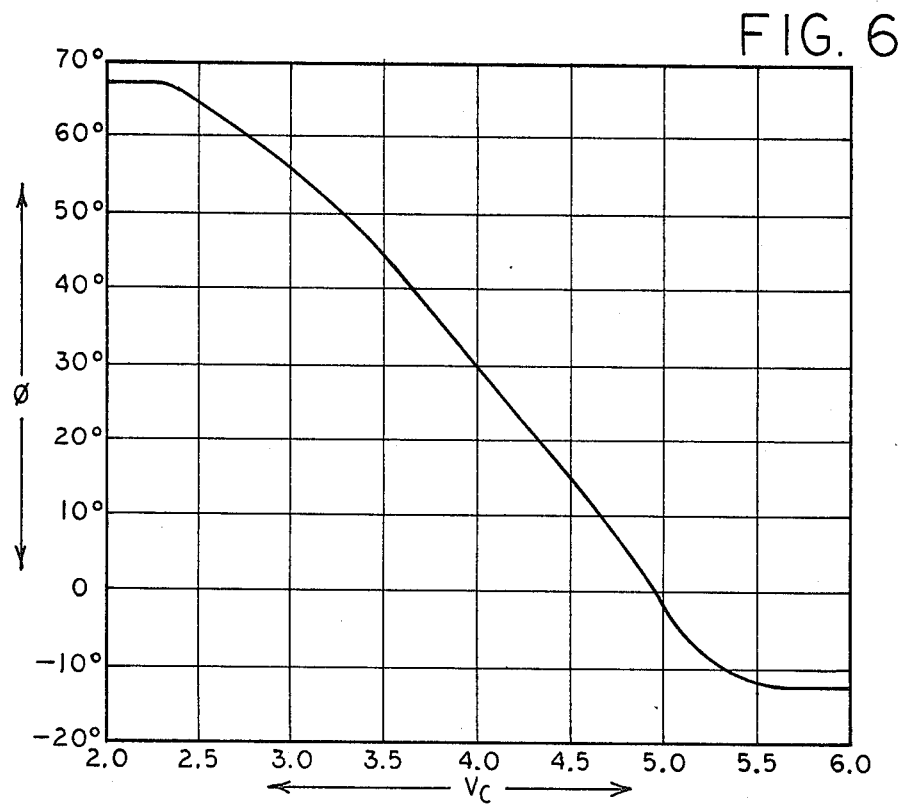
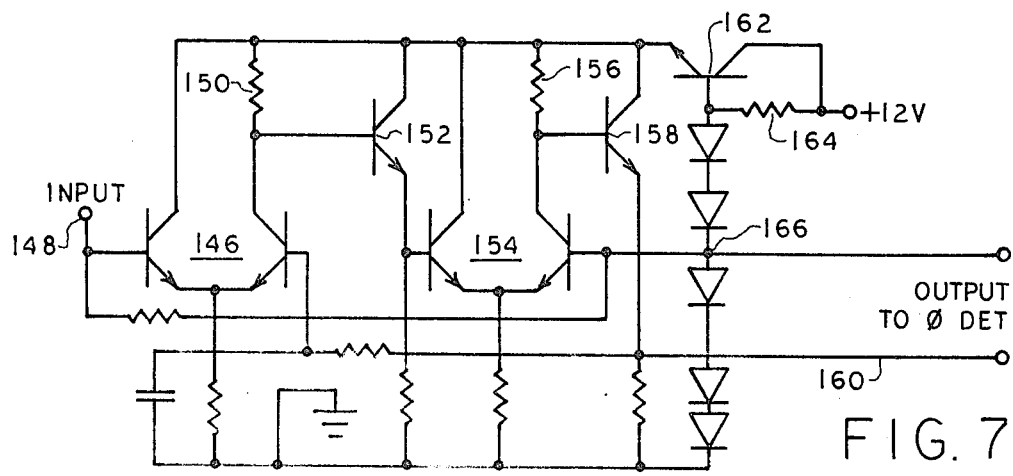

SYNCHRONOUS DETECTION SYSTEM

BACKGROUND OF THE INVENTION

The present invention relates generally to television receivers, and particularly to improvements in synchronous detection systems for use in television receivers.

Present high quality television receivers generally employ a synchronous detector rather than a diode detector for detecting video signals. The advantages of synchronous detection are well known and need not be detailed. Suffice it to say that the resultant picture which the receiver generates is of a higher quality than that obtainable by use of a diode detector.

As is well known, a synchronous detector receives a 45 megahertz video signal and an oscillator signal which is of exactly the same frequency and of substantially the same phase as the video signal. To develop the oscillator signal, a phase-locked loop is usually employed wherein a limiter limits the amplitude of the video signal and applies the limited video signal to a phase detector. The phase detector also receives an oscillation signal from a VCO (voltage controlled oscillator) and generates an error signal for locking the VCO to the frequency of the video signal. When such frequency lock occurs, the phase of the oscillator signal is also generally locked such that it is in phase quadrature with the video signal received by the phase detector. As a result of such quadrature phase lock, the oscillator signal must be shifted in phase by ninety degrees to bring it into alignment with the phase of the video signal which is received by the synchronous detector, thereby to provide the proper detection axis for the synchronous detector.

One way in which the detection axis of the synchronous detector has been at least partially adjusted is by modifying the phase response of the limiter. To accommodate such modification, the limiter conventionally includes a variable tuned circuit which serves multiple purposes. One of those purposes is to modify the phase of the limited video signal so that the VCO locks at a phase at which an acceptable detection axis occurs. Another purpose of the tuned circuit is to adjust the limiter for optimum differential phase performance. However, adjusting the tuned circuit for optimum performance of one of its functions causes another of its functions to be performed less than optimally. For example, when the tuned circuit is adjusted for the best detection axis, its differential phase performance may suffer. Likewise, when the tuned circuit is adjusted for best differential phase performance, the VCO may be locked to a phase which produces an undesirable detection axis. Hence, the adjustment of the tuned circuit has been a compromise among conflicting requirements, none of which end up being met optimally. Hence, the qualities inherent in synchronous detection have not been taken advantage of to the fullest desirable extent.

OBJECTS OF THE INVENTION

It is a general object of the invention to provide an improved synchronous detection system for use in a television receiver.

It is a more specific object of the invention to provide a synchronous detection system in which the detection axis of a synchronous detector is adjustable independently of other considerations.

It is a further object of the invention to provide a synchronous detection system in which the detection axis is adjustable over a highly reproducible range.

BRIEF DESCRIPTION OF THE FIGURES

The objects stated above and other objects of the invention are more particularly set forth in the following detailed description and in the accompanying drawings, of which:

FIGS. 4 and 5 are vector diagrams useful in explaining the operation of the phase adjustment network;

FIG. 6 is a graph illustrating a typical phase range over which the phase adjustment network is variable; and FIG. 7 is a circuit diagram of an untuned limiter which may be employed in the system of FIG. 1.

DESCRIPTION OF THE PREFERRED EMBODIMENT

Figure 1:
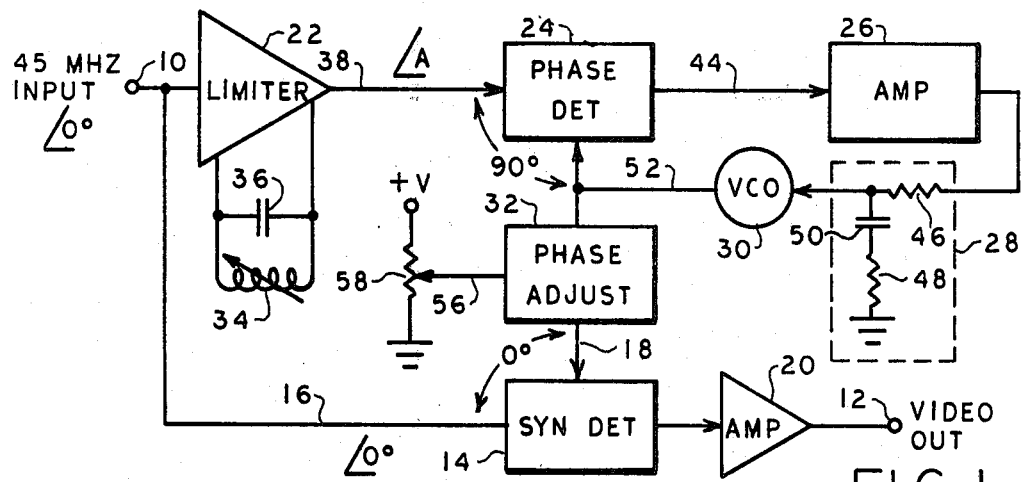
FIG. 1 is a block diagram of a synchronous detection system according to the invention.

Referring to the drawings, and FIG. 1 in particular, an improved synchronous detection system is shown. The illustrated system receives a 45 megahertz video signal at an input terminal 10 and provides a detected video signal at an output terminal 12. Actual detection of the video signal is effected by a conventional synchronous detector 14 which receives the undetected video signal via lead 16 and an oscillator signal via a lead 18. In response to its inputs, the detector 14 synchronously demodulates or detects the video signal, and an amplifier 20 amplifies the detected video signal to a usable level for further processing.

To properly detect the video signal, the frequency of the oscillator signal fed to the detector must be equal to the frequency (45 megahertz) of the input video signal. Proper operation of the detector 14 also depends on its detection axis being properly selected. In many cases, a proper detection axis occurs when the phase of the oscillator signal on the lead 18 is the same as the phase of the video signal received by the detector 14. In FIG. 1, the phase of the latter video signal is indicated as being at an angle of zero degrees. Also, a phase difference of zero degrees is indicated between the leads 16 and 18 to illustrate the preferred condition in which the oscillator signal has been adjusted for a detection axis of zero degrees.

To lock the oscillator signal at the desired frequency and phase, the system includes a limiter 22, a phase detector 24, a D.C. amplifier 26, a filter 28, a VCO 30, and a phase-adjustment network 32.

Referring more particularly to the limiter 22, the latter device receives the input video signal for limiting the amplitude of the video signal to a predetermined level. As stated above, the limiter may include a variable tuned circuit, shown as a variable coil 34 in parallel with a capacitor 36. In conventional systems, the coil 34 is usually adjusted to provide some phase shift to the video signal and to provide acceptable differential phase performance. However, adjusting the coil 34 for best differential phase performance also shifts the phase of the video signal, thereby shifting the phase angle to which the oscillator signal on the lead 18 becomes locked. Frequently, that resultant phase angle does not correspond to the desired detection axis. Likewise, if the coil 34 is adjusted for a proper detection axis, the resultant differential phase performance of the limiter is not entirely satisfactory. However, this conflict between proper settings of the coil 34 is eliminated in the illustrated system by the phase-adjustment network 32, as described in more detail below.

Figure 2:
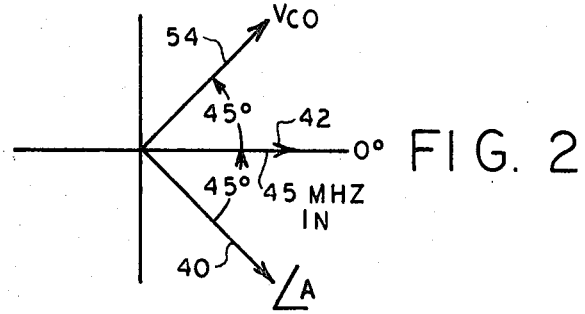
FIG. 2 is a vector diagram illustrating phase relationships among signals associated with the system of FIG. 1.

The limited video signal emanating from the limiter 22 appears on a lead 38 at some phase angle A, the magnitude of the angle A depending on the characteristics of the limiter 22. As shown in FIG. 2, for example, the limited video signal represented by the vector 40 may trail the input video signal (vector 42) by about forty-five degrees.

The conventional phase detector 24 receives the output of the limiter 22 and the oscillator signal from the VCO 32, and operates conventionally to develop at its output lead 44 a signal representative of the frequency difference between the oscillator signal and the video signal. The signal developed by the phase detector 24 is amplified by the amplifier 26 and filtered by the conventional filter 28 comprising resistors 46 and 48 and capacitor 50. The filtered signal is applied to the VCO 30 to tune it to the frequency of the video signal received by the phase detector 24. With this arrangement, the phase detector 24, the amplifier 26, the filter 28, and the VCO 30 together operate as a conventional phase locked loop. The resultant oscillator signal on the lead 52 has a frequency equal to the frequency of the video signal and a phase which is in quadrature with the video input to the phase detector 24. As shown by the vector 54 in FIG. 2, the VCO signal at lead 52 leads the video input (vector 40) to the phase detector by ninety degrees, and leads the video signal at lead 16 by about forty-five degrees.

To provide the synchronous detector with an oscillator signal whose phase corresponds to the desired detection axis, the VCO signal should be shifted by about forty-five degrees to bring it into phase alignment with the video signal received by the synchronous detector 14. However, such a shift in the phase of the VCO signal should not be effected at the expense of proper differential phase performance by the limiter 22. That is, the phase shift required of the VCO signal should be effected so as to provide a proper axis of detection without causing compromised performance by any other element of the system. To achieve this result, the phase adjustment network 32 receives the output of the VCO, shifts the phase of the VCO signal, and applies the phase shifted VCO signal to the synchronous detector via lead 18.

To shift the phase of the VCO signal a desired amount, a control signal is generated on a lead 56 which is coupled to a wiper arm of a variable resistor 58. The resistor 58 is preferably coupled between a supply voltage and ground so that a continuously variable D.C. control signal is available on the lead 56. The phase-adjustment network 32 responds by shifting the phase of the VCO signal by an amount determined by the value of the control signal. Hence, the phase of the VCO signal is easily and accurately shifted to provide the desired detection axis, thereby freeing the coil 34 to be adjusted to meet other criteria, such as differential phase performance.

In some applications, the coil 34 and the capacitor 36 may be eliminated entirely, the only adjustment being to the phase-adjustment network 32. Hence, the illustrated system provides for adjustment of the synchronous detector's detection axis independently of other considerations.

Figure 3:
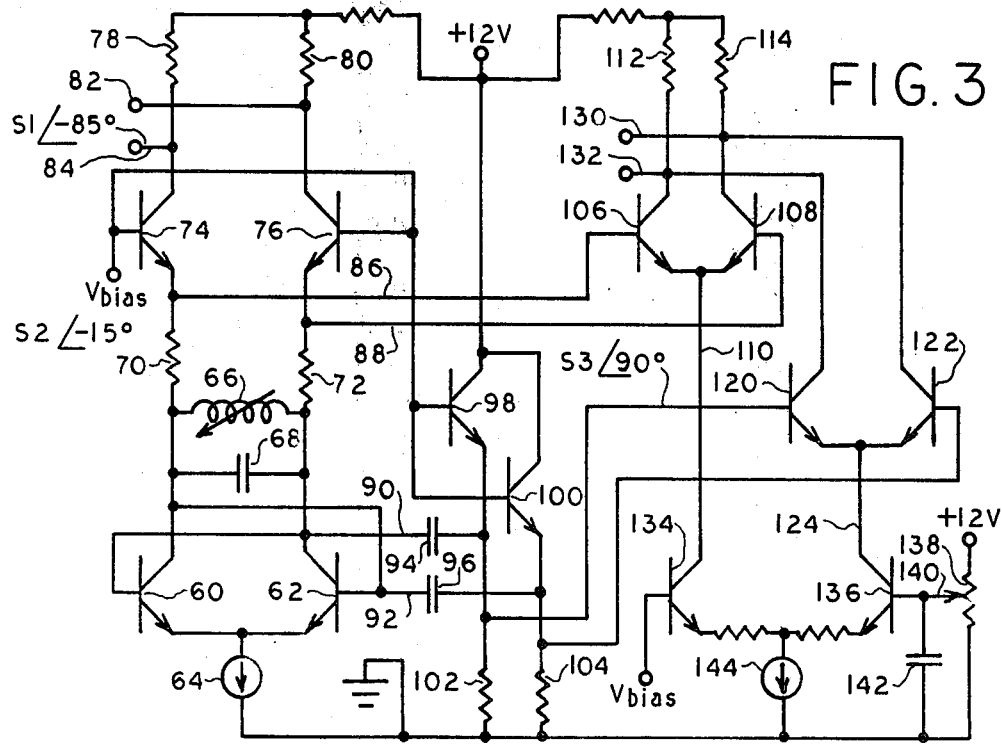
FIG. 3 is a detailed circuit diagram of a preferred phase adjustment network for use in the system of FIG. 1.

Referring now to FIG. 3, there is shown a preferred embodiment of the phase adjustment network 32. The illustrated embodiment includes an oscillator comprising transistors 60 and 62 connected as a differential amplifier, a current source 64 for the differential amplifier, a coil 66 and a capacitor 68, all interconnected as shown. The collectors of the transistors 60 and 62 are coupled through resistors 70 and 72 to the emitters of two grounded base transistors 74 and 76, the latter of which receive a bias potential at their bases and develop oscillator signals of opposite polarities across their load resistors 78 and 80. The latter signals are coupled via leads 82 and 84 to the phase detector 24 (FIG. 1) for comparison with the video signal. In the illustrated embodiment, the signal on lead 84, referred to herein as S1, has a phase of approximately −85° with respect to the zero degree detection axis of the synchronous detector. The signal on the lead 82 is, of course, the phase compliment of the signal S1. For convenience, however, where a pair of signals which enjoy mutually complimentary phases are developed, only one of those signals is traced throughout the circuit. It will be understood from the drawings that its complimentary signal follows a corresponding path, Further oscillator signals are developed at leads 86 and 88 which are coupled to the emitters of the transistors 74 and 76. The signal on the lead 86 has a phase of approximately −15° and is referred to herein as S2. (Lead 88 carries the phase compliment of S1). The 70° difference in phase between the signals S1 and S2 is attributable to the inherent delay associated with the transistors 74 and 76 and the interaction between the resistors 78, 80 and capacitance at the collector terminals of the transistors 74 and 76.

A further output of the oscillator appears at leads 90 and 92, which couple an oscillator signal from the collectors of transistors 60 and 62 through a pair of capacitors 94 and 96 to the emitters of transistors 98 and 100. The latter transistors receive a bias voltage at their base terminals and include resistors 102 and 104 coupled between ground and their emitter terminals. Hence, a low impedance is established at the emitter terminals of the transistors 98 and 100. With this arrangement, the capacitors 94 and 96, together with the transistors 98 and 100, constitute a phase shifter which shifts the phase of the oscillator signals on leads 90 and 92 by 90°. The phase shifted signal appearing at the emitter of the transistor 98 is referred to herein as S3 and has a phase of approximately 90°. At this juncture, therefore, the oscillator and the phase shifter have developed a pair of signals S2 and S3 of differing phases. As will now be described, the signals S2 and S3 are mixed in controllable proportions to develop an output signal whose phase is determined by the relative mixed proportions of the signals S2 and S3. That output signal corresponds to the signal received by the synchronous detector via lead 18 in FIG. 1.

To mix the signals S2 and S3 (and their phase compliments), a current steering circuit is included for steering proportioned amounts of the oscillator signal S2 and the phase shifted signal S3 to a load across which the output signal is developed. In this manner, the output signal developed across the load has a phase which is determined by the vector sum of the signals S2 and S3 which are mixed in the load.

In the illustrated embodiment, the current steering circuit includes a first differential amplifier comprising transistors 106 and 108. These transistors receive the signal S2 (and its phase compliment) at their base terminals and a source current at their common emitter lead 110. Assuming that some value of source current flows in the lead 110, a corresponding collector current flows in load resistors 112 and 114. The voltage developed across the resistors 112 and 114 corresponds to the oscillator signal S2, except that its phase is shifted by approximately 70° by the delay inherent in the transistors 106 and 108 and the interaction between the resistors 112 and 114 and the capacitance present at the collector terminals of the transistors 106 and 108. Thus, as shown in FIG. 4, the output signal at the collector terminal of the transistor 106 (vector 116) has a phase of approximately −85°. Its complement, vector 118, indicates the phase of the signal developed at the collector terminal of the transistor 108. Thus, the phase of the signal at the collector terminal of the transistor 106 is equal to the phase of the oscillator signal at lead 84. Likewise, the phase of the signal at the collector terminal of the transistor 108 is equal to the phase of the oscillator signal at lead 82.

Because the transistors 74, 76, 106 and 108 are substantially identical when constructed in integrated circuit form, as are the resistors 78, 80, 112 and 114, the phases of the signals at leads 82 and 84 will track with the phases of the signals at the collector terminals of the transistors 106 and 108.

To vary the phase of the signals at the collector terminals of the transistors 106 and 108, a second differential amplifier, comprising transistors 120 and 122, receives the signal S3 (and its phase compliment) and develops collector signals according to S3 for summing with the signals developed by the transistors 106 and 108. To achieve this function, the base terminals of the transistors 120 and 122 are coupled to the emitters of the transistors 98 and 100, respectively, for receiving the signal S3 (and its phase compliment). Also, the emitters of the transistors 120 and 122 receive a source current via a lead 124, and their collectors are coupled to the load resistors 112 and 114. Assuming that some current flows in the lead 124, the transistor 120 develops across the load resistor 112 a signal whose phase is approximately 20°, as indicated by the vector 126 in FIG. 5. In addition, the transistor 122 develops across the load resistor 114 a signal whose phase is approximately −160°, as indicated by the vector 128 in FIG. 5. Hence, the output signal developed across the resistor 114 consists of the sum of the signals developed by the transistors 108 and 122, the phase of which corresponds to the vector sum of vectors 128 and 118. Likewise, the output signal developed across the resistor 112 consists of the sum of the signals developed by the transistors 106 and 120, the phase of which corresponds to the vector sum of vectors 116 and 126. These output signals are coupled via leads 130 and 132 to the synchronous detector 14 for detecting the video signal along a detection axis determined by the phase of the output signals.

To effect a desired detection axis, the phase of the output signals at leads 130 and 132 is varied by varying the level of current in the leads 110 and 124. For example, when the lead 110 carries no current and the lead 124 carries a given level of current, the transistors 106 and 108 are off and the transistors 120 and 122 are on. In this condition, the vectors 116 and 118 (FIG. 4) are of zero amplitude, wherefore the signals at leads 130 and 132 correspond to the vectors 126 and 128 (FIG. 5). Similarly, when only the lead 110 carries current, the signals at leads 130 and 132 correspond to the vectors 116 and 118. Hence, the phase of the signal at the lead 130 is varied between −160° (vector 128) and +95° (vector 118), and the phase of the signal at the lead 132 is varied between −85° (vector 116) and +20° (vector 126) by varying the ratio of current sourced to the first and second differential amplifiers.

Preferably, the variation in the ratio of current sourced to the first and second differential amplifiers is effected by a third differential amplifier comprising transistors 134 and 136 and a control signal developed by a variable resistor 138. As shown, the transistor 134 receives a fixed bias at its base terminal and is coupled to the lead 110 via its collector terminal. The transistor 136 receives a variable bias at its base terminal by coupling the latter terminal to a wiper arm 140 of the resistor 138. By coupling the resistor 138 between ground and a positive potential, a selectably variable D.C. bias for the transistor 136 is obtained by adjustment of the wiper arm 140. A bypass capacitor 142 removes high frequency components from the base terminal of the transistor 136.

Because the emitters of the transistors 134 and 136 are coupled to a D.C. current source 144, the total current carried in the leads 110 and 124 equals the value of the current source 144. However, the ratio of the currents flowing in the leads 110 and 124 varies as a function of the value of the control signal received from the wiper arm 140. For example, when the value of the control voltage is substantially more positive than the value of the bias applied to the base of the transistor 134, the latter transistor is off and the transistor 136 sources all of the current from the source 144 to transistors 120 and 122. In this condition, the phases of the output signals at leads 130 and 132 are at one extreme illustrated by the vectors 126 and 128. When the wiper arm 40 is adjusted so that the transistor 136 is off, all of the current supplied by the source 144 is fed to the transistors 106 and 108, whereupon the phases of the output signals at levels 130 and 132 are at the opposite extreme illustrated by the vectors 116 and 118. At intermediate settings of the wiper arm 140, current flows in both leads 110 and 124, thereby providing output signals at the leads 130 and 132 whose phase varies between the extremes noted above.

To illustrate the way in which the phase of the signals at leads 130 and 132 varies with respect to the phase of the signals at leads 82 and 84, reference is made to FIG. 6. The illustrated curve shows how variations in the value of the control signal Vc produce a relative phase shift which extends from approximately +68° to −12°, a range of about 80°. Although such a relative phase shift is less than that which is theoretically obtainable, it nevertheless provides an adequately large range over which the detector axis may be adjusted.

As stated above, the detection system may, at least in some applications, employ a limiter which is not capable of being variably tuned. One such exemplary limiter is shown in FIG. 7.

The illustrated limiter includes a first differential amplifier 146 receiving the video signal at its input terminal 148. The output of the amplifier 146 appears across its load resistor 150 and is coupled via an emitter follower 152 to a second differential amplifier 154.

The amplified video signal developed across another load resistor 156 is coupled via another emitter follower 158 to an output lead 160 for application to the phase detector.

Power for the limiter is provided by a transistor 162 whose collector is coupled to a positive voltage source and whose emitter is coupled to the collectors of all other transistors in the limiter. A bias supply is provided by a resistor 164 coupled between the base and collector of the transistor 162 and by an illustrated string of diodes coupled between the resistor 164 and ground. The diode junction 166 is coupled to the differential amplifiers 146 and 154 so as to establish D.C. feedback to maintain circuit balance and to assist in establishing a relatively flat phase response, irrespective of variation in the amplitude of the input video signal at terminal 148. The diode junction 166 also serves as another input to the phase detector.

The detection system described above avoids the major problems associated with conventional systems in that the detector's axis of detection is adjustable independently of other considerations. Therefore, any desired axis of detection may be selected without degrading system performance.

Although the illustrated embodiment is designed to provide a zero degree detection axis, it may be slightly modified to provide a 180° detection axis with respect to incoming video. With the latter axis, the detected video is merely inverted with respect to the detected video which is obtained with a zero degree detection axis.

A further significant advantage is that the range over which the detection axis may be varied is not only highly reproducible, it is also highly flexible. That is, with slight modification, the system provides an adjustable detection axis in any of the four phase quadrants. In the illustrated embodiment, the quadrant in which the detection axis is varied may be altered by interchanging the inputs to the bases of the transistors 106 and 108 (FIG. 3), or by interchanging the inputs to the bases of transistors 120 and 122. A similar effect is achieved by reversing the connections to the load resistors 112 and 114. For example, the load resistor 112 may receive the collector currents of transistors 106 and 122 and the load resistor 114 may receive the collector currents of transistors 108 and 120. Hence, the illustrated detection system is easily adjustable to accommodate a variety of phase requirements.

Although the invention has been described in terms of a preferred embodiment, it will be obvious to those skilled in the art that many alterations and modifications thereto may be made without departing from the invention. Accordingly, it is intended that all such alterations and modifications be included within the spirit and scope of the invention as defined by the appended claims.

What is claimed is:

1. A synchronous detection system for detecting a video signal in a television receiver, comprising:
   a limiter for receiving and limiting the amplitude of the video signal to a predetermined level;
   a phase-locked loop, including a voltage controlled oscillator, receiving the limited video signal for developing an oscillator signal whose frequency is equal to the frequency of the video signal;
   a phase-adjustment network receiving the oscillator signal from the phase-locked loop, including means for developing an adjustable and continuously variable D.C. control signal and means responsive to incremental changes in the value of said control signal for incrementally adjusting the phase of the oscillator signal to a desired detection axis; and
   a synchronous detector receiving the video signal and the phase-adjusted oscillator signal from said phase-adjustment network for detecting the video signal along said detection axis.

2. A system as set forth in claim 1 wherein said limiter has a non-variable phase response, whereby the only adjustment to the phase of the locked oscillator signal is by means of said phase adjustment network.

3. A synchronous detection system for detecting a video signal in a television receiver, comprising:
   a limiter for receiving and limiting the amplitude of the video signal to a predetermined level;
   a phase-locked loop, including a voltage controlled oscillator receiving the limited video signal for developing an oscillator signal whose frequency is equal to the frequency of the video signal and whose phase is locked to a given phase;
   a phase-adjustment network receiving the oscillator signal from the phase-locked loop for adjusting the phase thereof to a desired detection axis, said phase-adjustment network including means for developing an adjustable D.C. control signal, a phase shifter receiving the oscillator signal for developing therefrom a phase-shifted signal, and a current steering circuit responsive to the value of said control signal for steering proportioned amounts of the oscillator signal and the phase-shifted signal to a load for application to said synchronous detector such that the signal applied to the synchronous detector has a phase determined by the vector sum of the oscillator signal and the phase-shifted signal.

4. A system as set forth in claim 3 wherein said phase shifter includes means for capacitively coupling the oscillator signal to a low impedance for developing the phase-shifted signal across said low impedance such that the phase-shifted signal is shifted in phase by approximately ninety degrees from the oscillator signal.

5. A system as set forth in claim 3 wherein said current steering circuit includes a first differential amplifier receiving the oscillator signal, a second differential amplifier receiving the phase-shifted signal, a load connected in common with said first and second differential amplifiers, and means responsive to the value of said control signal for proportioning the conduction level of said first and second differential amplifiers such that a signal corresponding to proportioned amounts of the oscillator and phase-shifted signals is developed across said load.

6. A system as set forth in claim 5 wherein said first differential amplifier includes two base terminals receiving the oscillator signal, said second differential amplifier includes two base terminals receiving the phase-shifted signal, and wherein said proportioning means includes a third differential amplifier having a pair of outputs connected as current sources for said first and second differential amplifiers and having an input responsive to the value of said control signal for proportioning the current sourced to said first and second differential amplifiers.

7. A synchronous detection system for detecting video signals in a television receiver, comprising:
   a limiter for receiving and limiting the amplitude of the video signal to a predetermined level;

a phase-locked loop, including a voltage controlled oscillator, receiving the limited video signal for developing an oscillator signal whose frequency is equal to the frequency of the video signal;

a phase-adjustment network including:
  (a) a phase shifter receiving the oscillator signal for developing therefrom a phase-shifted signal;
  (b) a first differential amplifier which receives the oscillator signal, a second differential amplifier receiving the phase-shifted signal, and a load connected in common with the first and second differential amplifiers;
  (c) means for developing a control signal of an adjustable value; and
  (d) means responsive to the value of said control signal for proportioning the conduction level of said first and second differential amplifiers such that an output signal corresponding to proportioned amounts of the oscillator and phase-shifted signals is developed across the load; and a synchronous detector receiving the video signal and the output signal from said phase-adjustment network for detecting the video signal.

8. A system as set forth in claim 7 wherein said first differential amplifier includes two base terminals receiving the oscillator signal, said second differential amplifier includes two base terminals receiving the phase-shifted signal, and wherein said proportioning means includes a third differential amplifier having a pair of outputs connected as current sources for said first and second differential amplifiers and having an input responsive to the value of said control signal for proportioning the current sourced to said first and second differential amplifiers.

* * * * *